US012811395B2

(12) United States Patent
Tilotta et al.

(10) Patent No.: US 12,811,395 B2
(45) Date of Patent: Nov. 24, 2026

(54) LOAD MANAGEMENT CONTROL SYSTEM

(71) Applicant: VERTIV CORPORATION, Westerville, OH (US)

(72) Inventors: Livio A. Tilotta, Imola (IT); Stefano Pecorari, Modena (IT); Arturo Di Filippi, Bologna (IT); Graziano Galuppi, Imola BO (IT); Brian Heber, Ostrander, OH (US); Terry D. Bush, Westerville, OH (US)

(73) Assignee: Vertiv Corporation, Westerville, OH (US)

( * ) Notice: Subject to any disclaimer, the term of this patent is extended or adjusted under 35 U.S.C. 154(b) by 0 days.

(21) Appl. No.: 19/191,646

(22) Filed: Apr. 28, 2025

(65) Prior Publication Data

US 2025/0392132 A1 Dec. 25, 2025

Related U.S. Application Data

(60) Provisional application No. 63/662,701, filed on Jun. 21, 2024.

(51) Int. Cl.
*H02J 3/0014* (2026.01)
*H02J 4/00* (2026.01)
*H02J 7/00* (2026.01)

(52) U.S. Cl.
CPC .............. *H02J 3/0014* (2026.01); *H02J 4/00* (2013.01); *H02J 7/865* (2026.01)

(58) Field of Classification Search
CPC ............. H02J 3/0014; H02J 7/865; H02J 4/00
(Continued)

(56) References Cited

U.S. PATENT DOCUMENTS 8,193,662 B1 * 6/2012 Carlson ..................... G06F 1/30 307/64
2007/0005195 A1 * 1/2007 Pasquale ................... H02J 3/00 700/291

(Continued)

FOREIGN PATENT DOCUMENTS

DE 202014007954 U1 11/2014

OTHER PUBLICATIONS

European Search Report received in EP Application No. 25176271.2, Oct. 27, 2025, 9 pages.

(Continued)

*Primary Examiner* — Michael R. Fin
(74) *Attorney, Agent, or Firm* — Suiter Swantz IP

(57) ABSTRACT

A system and method for multi-distribution load management control includes a controller for managing power distribution from a utility alternating-current (AC) source and at least one rapid-recharge direct-current (DC) storage device. The controller detects a load change event, e.g., load step or load drop associated with periodic fluctuation or cycling of high rate of change loads between peak and minimum power levels. Based on rate of change of the load change event, an average load power is determined. The controller maintains the average load power drawn from the utility source by supplying the high rate of change loads from the utility source and DC storage device in proportion. During minimum power cycles associated with the high rate of change loads, the average load power is maintained and power diverted in proportion to the DC storage device for recharging in preparation for the next peak power cycle.

15 Claims, 10 Drawing Sheets

(58) Field of Classification Search
USPC .............................................................. 307/26
See application file for complete search history.

(56) References Cited

U.S. PATENT DOCUMENTS

| | | | | |
|---|---|---|---|---|
| 2013/0154377 | A1* | 6/2013 | Isomura | H02J 9/04 307/65 |
| 2018/0157563 | A1* | 6/2018 | Bryant | G06F 11/2015 |
| 2018/0159330 | A1 | 6/2018 | Kang | |
| 2025/0070551 | A1* | 2/2025 | Novak | H02J 1/106 |

OTHER PUBLICATIONS

Luciano De Pontes Raphael et al: "GreenPeaks: Employing Renewables to Effectively Cut Load in Electric Grids", 2018 IEEE International Conference on Smart Computing (SMARTCOMP), IEEE, Jun. 18, 2018 (Jun. 18, 2018), pp. 123-130, XP033379079, DOI: 10.1109/SMARTCOMP.2018.00082 [retrieved on Jul. 26, 2018].

* cited by examiner

LOAD MANAGEMENT CONTROL SYSTEM

CROSS-REFERENCE TO RELATED APPLICATIONS

The present application claims the benefit under 35 U.S.C. § 119(e) of U.S. Provisional Patent Application Ser. No. 63/662,701 filed Jun. 21, 2024 and titled LOAD MANAGEMENT CONTROL SYSTEM. Said U.S. Provisional Patent Application 63/662,701 is incorporated herein by reference in its entirety.

TECHNICAL FIELD

The present disclosure is directed to devices for managing power distribution from multiple alternating current (AC) and/or direct current (DC) sources to end users.

BACKGROUND

Rapid development of advanced calculation systems driven by artificial intelligence (AI) technologies is affecting electrical demand patterns associated with data centers. Conventionally, data centers have observed stable, consistent electrical demand patterns; only in specific cases (e.g., manual operations) or under anomalous conditions would demand change drastically. However, the amounts of energy required for simultaneous, complex AI-driven operations have resulted in more variable electrical demand curves. For example, AI data centers may run at a relatively low energy consumption rate for a duration, and then electrical demand may radically rise due to a sudden increase in required operations. While energy providers and sources (e.g., public grids, local generators) may be sized to accommodate the total amount of power required for AI-driven operations, they may be unable to accommodate the drastic changes in consumption rate required by AI loads. Consequently, the energy sources themselves may experience grid stability issues, generator voltage or frequency oscillations, or even collapse—which may cause downstream complications for any other users supplied by the same providers or sources.

SUMMARY

In a first aspect, a system for load management control of a power distribution system is disclosed. In embodiments, the system includes a controller device connected to a utility alternating-current (AC) grid, to a rapid-recharge direct-current (DC) storage device, and/or other AC or DC sources. The controller controls distribution of power from the AC and DC sources to loads associated with end users. In embodiments, certain loads (e.g., "demand loads") may be associated with load change events, e.g., load steps or load drops. The controller includes sensors for monitoring current, voltage, frequency, and other load characteristics of the end-user loads. The controller responds to detection of a load change event by determining an average load power to be drawn from the utility grid, e.g., based on a rate of change of the load change event. The controller maintains average load power drawn from the utility grid by supplying high rate of change loads in proportion from the utility grid, supplementing load demand in excess of the average load power (e.g., during peak power periods) from the rapid-recharge DC storage device. During minimum power periods associated with the high rate of change loads, the controller maintains the average load power and diverts power to recharging the DC storage device, such that the DC storage device is at full or adequate capacity for the next peak power cycle.

In some embodiments, the load change event (load step or load drop) is characteristic of periodic fluctuation or cycling of the load between a peak power level (e.g., for a peak power period) and a minimum power level (e.g., for a minimum power period).

In some embodiments, the controller maintains the determined average load power during the peak power period by proportionally supplying the demand load from the AC power source and from the DC energy storage device.

In some embodiments, the controller determines a duration of the peak power period based on the detected load change event and the peak power level.

In some embodiments, the controller maintains the average load power during the minimum power period by proportionally supplying the demand load and recharging the DC energy storage device from the AC power source.

In some embodiment, the controller determines that the energy level within the DC energy storage device (e.g., charge level) is above a maximum threshold level or below a minimum threshold level, and adjusts the recharging of the DC storage device by adjusting the proportion of power supplied to the demand load and to the DC storage device by the AC power source.

In some embodiments, the controller adjusts the recharging by increasing the proportional supply of power to the DC storage device from the AC power source.

In some embodiments, the controller determines a duration of the minimum power level based on the load change event and the minimum power level.

In some embodiments, the peak power period and the minimum power period are not equal.

In a further aspect, a method for load management control is disclosed. In embodiments, the method includes distributing power from a utility AC grid (which may include other AC and/or DC sources) to end user loads. The method includes detecting, via load characteristic sensors of the controller, a load change event associated with a load step, a load drop, or a high rate of change with respect to one or more end user loads. The method includes determining an average load power to be drawn from the utility AC grid based on the rate of change of the detected load event/s. The method includes maintaining the average load power drawn from the AC source by supplying the high rate of change loads by, for example, supplementing the average load power from the DC storage device in proportion to high rate of change loads during peak power cycles, and diverting power in proportion from the high rate of change loads to recharging of the DC storage device during minimum power cycles.

In some embodiments, the load change event is based on a fluctuation or cycling of the demand load between a peak power level (e.g., for a peak power period) and a minimum power level (e.g., for a minimum power period).

In some embodiments, maintaining the average load power includes maintaining the average load power during the peak power period by supplying the demand load proportionally from the AC power source and the DC energy storage device, e.g., X percent from the AC power source, Y percent from the energy storage device.

In some embodiments, maintaining the average load power includes maintaining the average load power during the minimum power period by proportionally supplying the demand load from the AC power source while also recharging the DC storage device via the AC power source, e.g., X percent of power from the AC power source supplied to the demand load and Y percent supplied to the energy storage device.

In some embodiments, the method includes detecting an energy level of the DC energy storage device beyond a threshold level (e.g., above a high threshold, below a low threshold). The method includes adjusting the recharging of the DC energy storage device based on the beyond threshold charge level by adjusting the proportional relationship between supplying the demand load and recharging the DC energy storage device (if applicable) via the AC energy source.

In some embodiments, adjusting the recharging includes increasing the recharge rate of the DC energy storage device by increasing the proportion of power supplied to the energy storage device from the AC power source.

In some embodiments, determining the average load power based on a rate of change of the at least one load change event includes determining the peak power level based on the duration of the peak power period and/or determining the minimum power level based on the duration of the minimum power period.

In some embodiments, the respective durations of the peak power period and the minimum power period are not equal.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
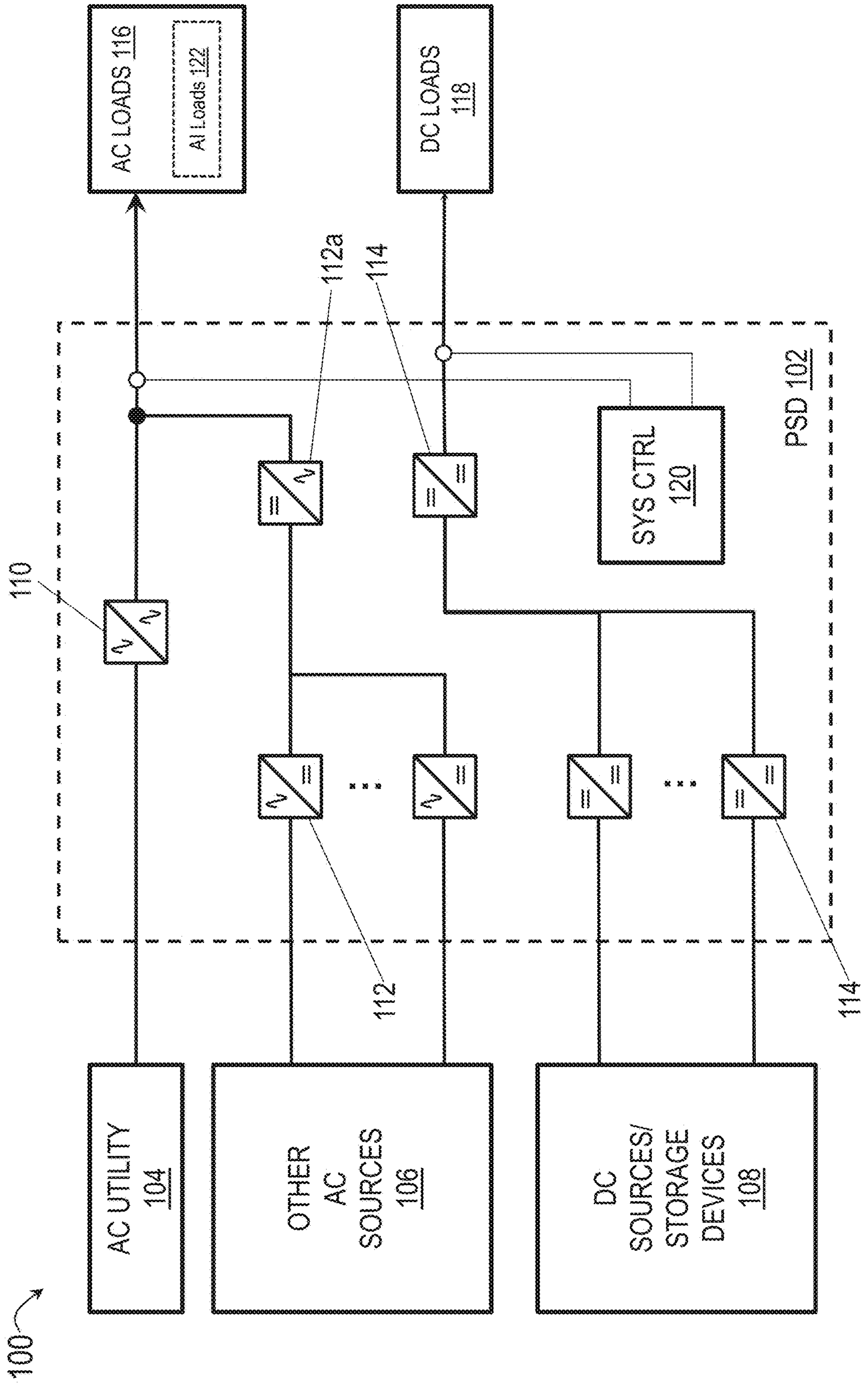
FIG. 1 is a block diagram of a power distribution system wherein power from alternating current (AC) and direct current (DC) sources are distributed to various AC and DC loads according to their demand.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein provide a multi-converter control system for managing the energy distribution from multiple AC and DC sources to satisfy the requirements of one or more AI loads subject to rapid shifts in energy consumption rate. For example, with respect to an AI load characterized by periodic shifts between a peak power demand and a minimum power demand, an average load power is determined and power distribution is regulated to maintain power drawn from a utility grid or like AC source at this average load power on a constant basis throughout peak and minimum demand phases. During peak demand cycles, demand is supplied by the utility grid at the average load power, supplemented by a rapid DC energy storage device. During minimum demand cycles, the reduced demand rate may be supplied by a portion of the average load power from the utility grid while a portion of the average load power is diverted to rapid recharging of the DC energy storage for the next peak demand cycle. Average load power may account for the storage capacity of the DC energy storage device, such that the DC energy storage device is recharged at the same rate at which it is depleted during peak demand cycles, and may adjust the amount of power provided by the utility to maintain the DC energy storage device at an optimal charge level.

Referring to FIG. 1, a load management system 100 is shown. For example, the load management system 100 may connect a power supply device 102 (PSD) to a utility alternating current (AC) power source 104 (e.g., utility grid), to additional AC power sources 106, and/or to direct current (DC) power sources 108. Further, AC or DC power provided by the utility AC power source 104, additional AC power sources 106, and/or DC power sources 108 may be rectified and/or converted by the power supply device 102 (e.g., via AC/AC converters 110, AC/DC converters 112, DC/AC inverters 112*a*, and/or DC/DC converters 114) to provide output power appropriate for AC loads 116 and/or DC loads 118 associated with end users.

In embodiments, the PSD 102 may further include a controller 120 for monitoring and managing the distribution of power from the utility AC power source 104, additional AC power sources 106, and/or DC power sources 108 to end user AC loads 116 and/or DC loads 118. For example, "demand loads" as used herein may include any AC load 116 or DC load 118 provided (e.g., "on demand") to an end user or end device. As noted above, however, while the utility AC power source 104, additional AC power sources 106, and/or DC power sources 108 may provide sufficient power to accommodate "AI loads" 122, e.g., AC loads characterized by rapid and/or periodic shifts in power demand. Other types of loads (e.g., mechanical loads, highly variable loads) may exhibit similar characteristics, leading to possible stability issues, oscillations, and/or potential grid collapse for other end users supplied by the load management system 100.

In embodiments, additional AC power sources 106 may include public grids, municipal grids, local grids, micro-grids, and/or AC generators. Similarly, DC power sources 108 may include batteries (e.g., rechargeable sodium ion (Na+) batteries), fuel cells, flywheels, renewable energy storage devices, and/or super capacitors.

Figure 2:
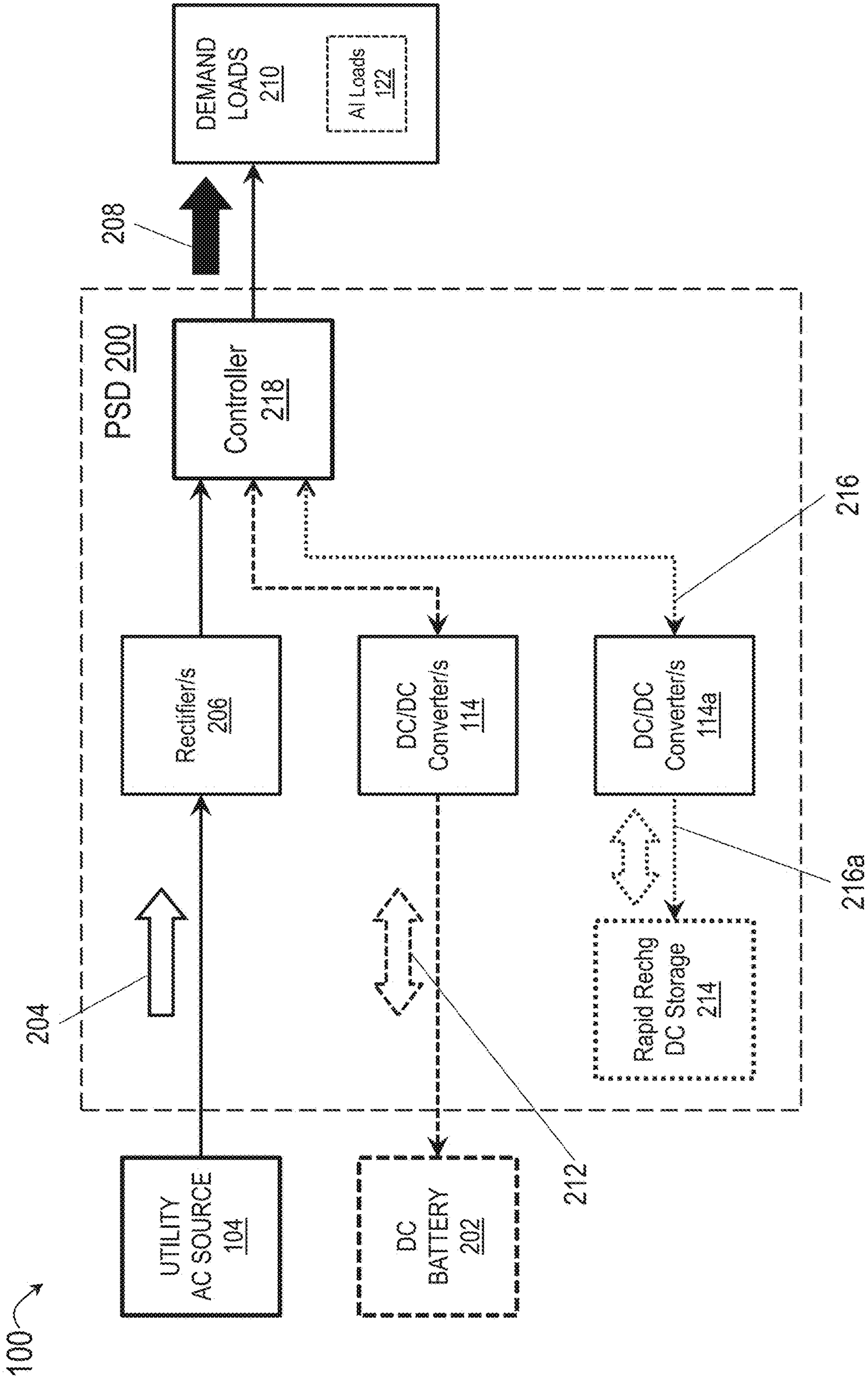
FIG. 2 is a block diagram of a load management control system according to example embodiments of the inventive concepts disclosed herein.

Referring to FIG. 2, the load management system 100 is shown. In embodiments, the load management system 100 may include a power supply device 200 (PSD; e.g., uninterruptible power supply (UPS)) for managing distribution of power from the utility AC source 104 (e.g., and/or other additional AC sources (106, FIG. 1)) and/or DC sources (108, FIG. 1; e.g., the DC battery 202)). For example, the utility AC source 104 may provide AC input power 204 for rectification (e.g., via rectifier/s 206) into load output power 208 for supply to demand loads 210 (e.g., one or more AC loads (116, FIG. 1) or DC loads (118, FIG. 1), each demand load associated with an end user or customer). Similarly, the DC battery 202 (e.g., valve regulated lead acid (VRLA) battery, $Li^+$ battery) may provide long-term DC input power 212 (e.g., via DC/DC converter/s 114), but may not be designed for frequent discharge and/or rapid recharging.

In embodiments, demand loads 210 (e.g., AC or DC end-user loads) may include one or more AI loads 122. For example, AI loads 122 as defined herein are not limited to artificial intelligence, large language model (LLM), neural network, or other like applications. Rather, AI loads 122 may include any load supplied by the utility AC power source 104 subject to rapid and/or periodic load events (e.g., load steps, load drops, load fluctuations) characteristic of, but not limited to, AI and like applications, as described in greater detail below.

In embodiments, the PSD 200 may include a rapid-recharge DC storage device 214, e.g., a supercapacitor, ultracapacitor, battery, or other like high-capacitance device. For example, the DC storage device 214 may be capable of both rapid discharge (e.g., via DC/DC converter/s 114*a*) and rapid recharge. Accordingly, the DC storage device 214 may provide rapid-delivery input power 216 during periods or phases of peak load power associated with AI loads 122 and other such loads characterized by high rates of change with respect to load demand and/or energy absorption (or, e.g., when a load step is detected with respect to one or more demand loads 210). Similarly, the DC storage device 214 may rapidly recharge (216*a*) during periods of minimum load power or, e.g., when a load drop is detected with respect to one or more AI loads 122 currently in a peak power period).

In embodiments, the PSD 200 may include a controller 218. For example, the controller 218 may include a control processor and/or sensors for monitoring load conditions (e.g., voltage, current, frequency) with respect to the demand loads 210. Further, the controller may monitor static and dynamic characteristics of each demand load 210, e.g., energy consumption of each individual load; total energy required to supply all current demand loads; rate of change of each demand load (e.g., load steps, load increases, load drops, load decreases); voltage, current, and frequency with respect to each current demand load. In embodiments, the controller 218 may detect, with respect to any current demand load 210 and/or AI load 122, a load step, a load drop, a peak power period, and/or a minimum power period.

Figure 3A:
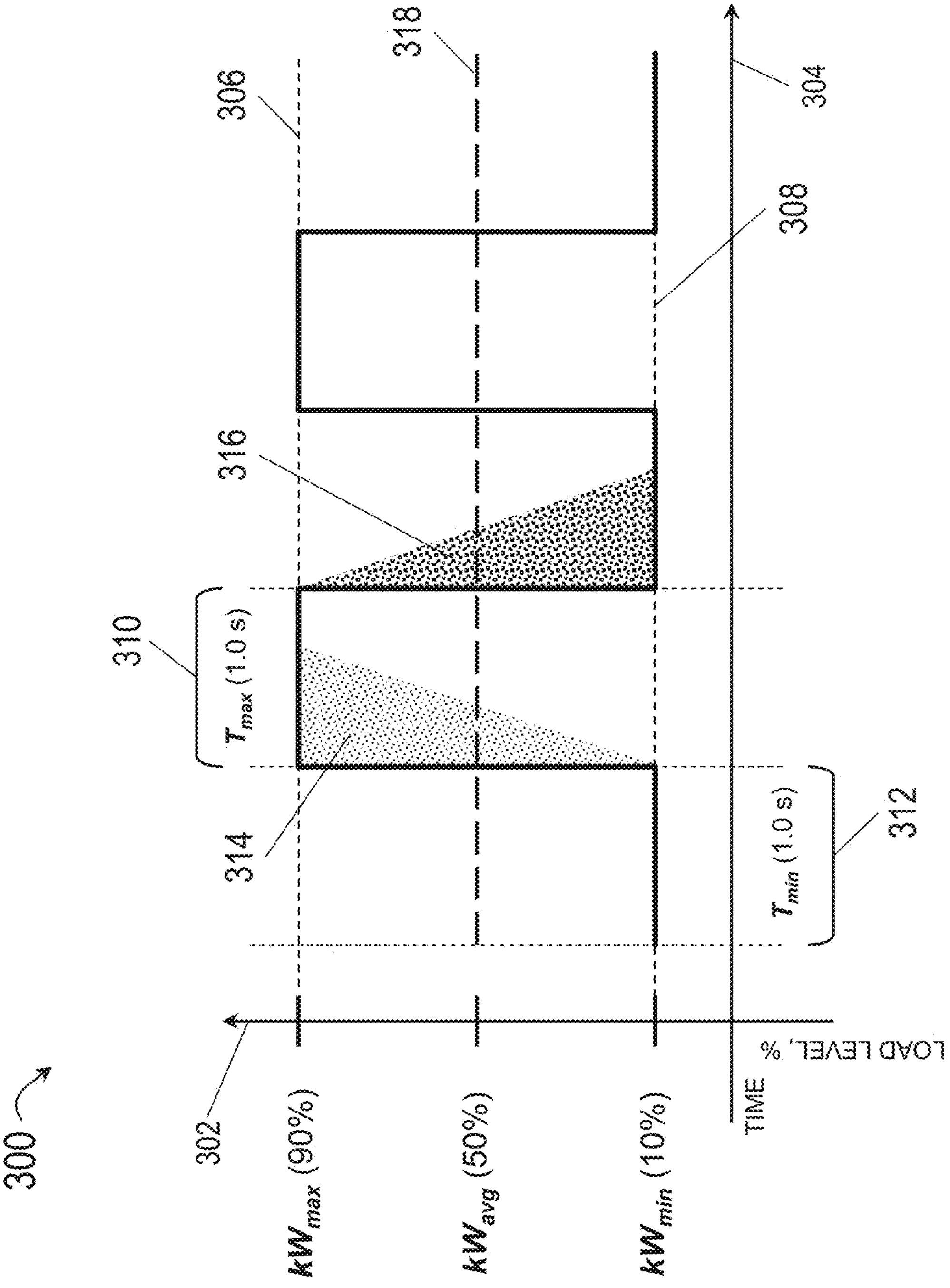
FIGS. 3A through 3C are graphical examples of load events characteristic of high rate of change energy absorption loads managed by the load management control system of FIG. 2.

Referring now to FIG. 3A, the graph 300 represents load level (e.g., as a percentage of peak kilowatts (kW); vertical axis 302) over time (T (e.g., in seconds s); horizontal axis 304) with respect to an AI load (122, FIG. 2) or demand load (210, FIG. 2) showing similar load characteristics.

In embodiments, the AI load 122 may be characterized by rapid and/or periodic shifts between a peak power level $kW_{max}$ and a minimum power level $kW_{min}$. For example, the load level may shift between the peak power level $kW_{max}$ (306; e.g., for a first time duration $T_{max}$, 310) and the minimum power level $kW_{min}$ (308; e.g., for a second time duration $T_{min}$, 312). In embodiments, when the load level of one or more demand load 210/AI loads 122 increases at a higher rate than the utility AC source (104, FIG. 1) can support, the AI loads may be supplied (314) via multiple power sources (e.g., AC sources and/or DC storage). Similarly, when the load level of one or more demand loads 210/AI loads 122 decreases at a higher rate than the utility AC source 104 can support, excess energy no longer required by the AI/demand loads may be stored (316) to batteries, flywheels, and/or any other available DC energy storage devices (214, FIG. 2; 108, FIG. 1) having storage capacity.

In embodiments, the controller (218, FIG. 2) may, when a load step or load drop is indicated in a demand load 210/AI load 122 by the load characteristics monitored by the controller, first determine an average load power $kW_{avg}$ 318.

For example, if the AI load 122 is observed to periodically shift between a peak power level 306 (e.g., for a peak duration 310) and a minimum power level 308 (e.g., for a minimum duration 312), the controller 218 may calculate the average load power 318 as $$kW_{avg} = \frac{(kW_{min} * T_{min} + kW_{max} * T_{max})}{T_{min} + T_{max}}$$

where $kW_{max}$, $kW_{min}$ are the peak and minimum power levels 306, 308 respectively, and $T_{max}$, $T_{min}$ are the respective peak and minimum durations 310, 312 of the peak and minimum power levels. In some embodiments, the controller 218 may calculate or infer values for $T_{max}$, $T_{min}$ as discussed below.

In embodiments, once the controller 218 has determined an average load power 318 for one or more AI loads 122, the controller may regulate power drawn from various sources (e.g., in addition to the utility AC source 104) in order to consistently maintain power drawn from the utility AC source to the AI load/s at or near the average load power. For example, still referring to FIG. 3A, according to the graph 300 an AI load 122 may exhibit power demand shifting from a minimum power level 308 of 10% load level to a peak power level 306 of 90% load level every second. Accordingly, the controller 218 may determine the average load power 318 as $$kW_{avg} = \frac{(10\%\ kW * 1\ s + 90\%\ kW * 1\ s)}{1\ s + 1\ s} = \frac{(0.1 + 0.9)\%\ kW/s}{2\ s} = 0.5 = 50\%\ kW$$

or 50% load level. Further, the controller 218 may regulate power to maintain output power to the AI load/s 122 at 50% load level as shown below by FIG. 4A.

Figure 3B:
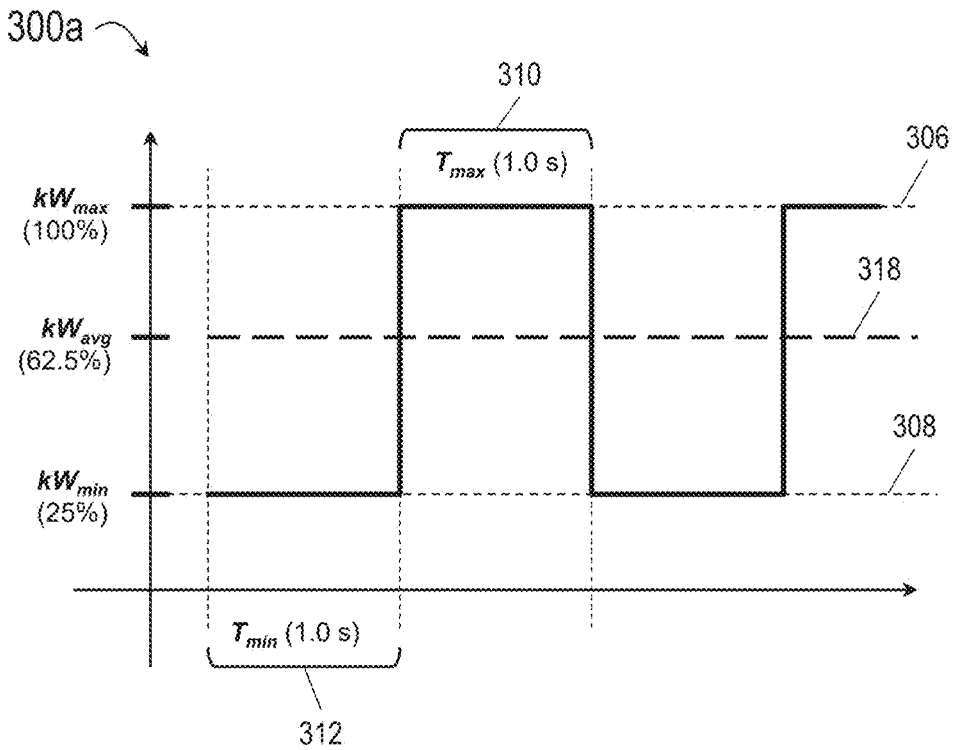
Figure 3C:
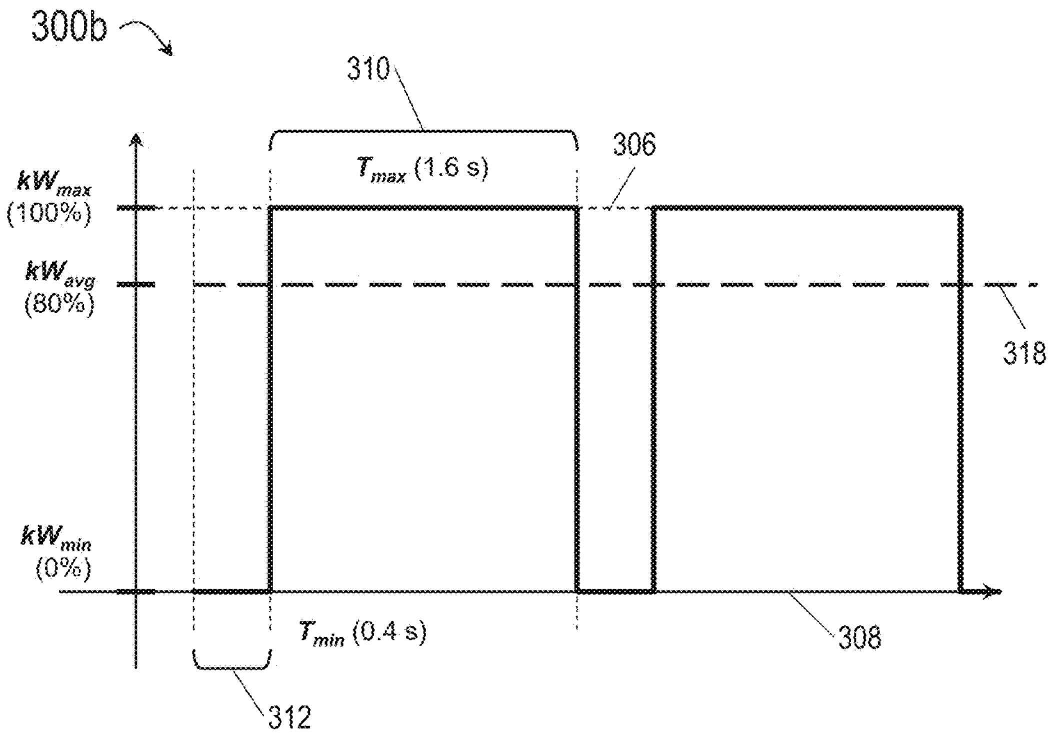

Referring also to FIGS. 3B and 3C, additional examples of AI loads 122, or demand loads 210 characterized by rapid or periodic shifts in load level, are shown.

In embodiments, referring in particular to FIG. 3B, according to the graph 300*a* the AI load/s 122 may indicate a load profile shifting between a minimum power level 308 of 25% load level and a peak power level 306 of 100% load level every second (i.e., wherein peak and minimum durations 310, 312 are both 1 s). Accordingly, the controller 218 may determine the average load power 318 as $$kW_{avg} = \frac{(25\%\ kW * 1\ s + 100\%\ kW * 1\ s)}{1\ s + 1\ s} = \frac{(0.25 + 1)\%\ kW/s}{2\ s} = 0.625 = 62.5\%\ kW$$

or 62.5% load level.

In some embodiments, the peak and minimum durations 310, 312 may not be equal. For example, referring in particular to FIG. 3C, the controller 218 may select a peak and/or minimum duration 310, 312 as described in greater detail below. According to the graph 300*b*, the AI load/s 122 may indicate a load profile shifting between a minimum power level 308 of 0% load level (e.g., but for a minimum duration 312 of $T_{min}$=0.4 seconds) and a peak power level 306 of 100% load level (e.g., for a peak duration 310 of $T_{max}$=1.6 seconds). Accordingly, the controller 218 may determine the average load power 318 as $$kW_{avg} = \frac{(0\%\ kW * 0.4\ s + 100\%\ kW * 1.6\ s)}{1\ s + 1\ s} = \frac{(0 + 1.6)\%\ kW/s}{2\ s} = 0.8 = 80\%\ kW$$

or 80% load level.

Figure 3D:
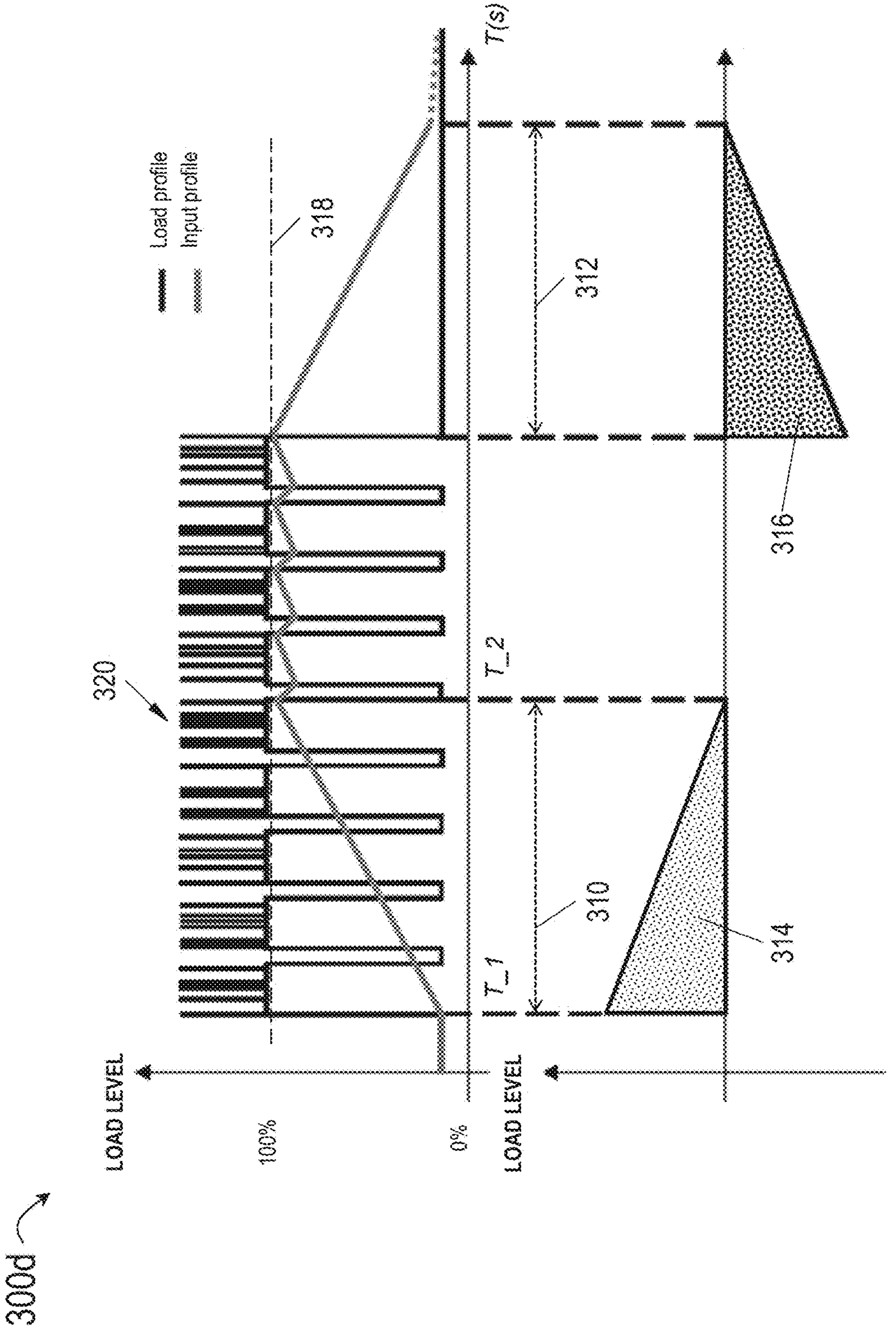
FIG. 3D is a graphical illustration of operations of the load management control system of FIG. 2 with respect to multiple load variations within the power distribution system of FIG. 1.

Referring now to FIG. 3D, the graph 300*d* may indicate multiple load variations (e.g., based on multiple AI loads 122), such that the required load level may spike (320) above 100% load level. Accordingly, the controller 218 may determine the average load power 318 across multiple demand loads 210 and/or AI loads 122, maintaining the average load power 318 drawn from the utility AC source (104, FIG. 1) at a consistent level by supplementing (314) the utility AC source with input power drawn from additional sources during peak power periods 310 (or, e.g., as total load demand increases) to meet the load profile and storing (316) excess energy from the additional sources (e.g., diverting a portion of the average load power from the utility AC source to recharging of the DC storage device 214) during minimum power periods (312) or as total load demand decreases.

Figure 4A:
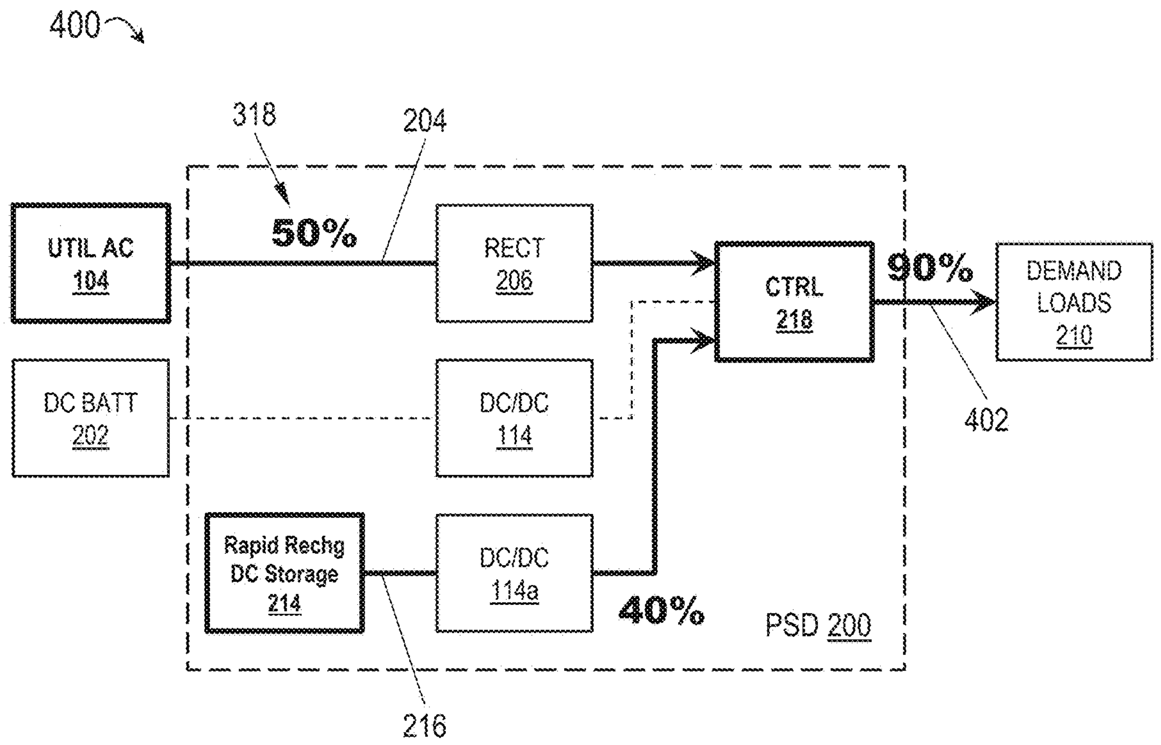
FIGS. 4A and 4B illustrate operations of the load management control system of FIG. 2 based respectively on the load conditions illustrated in FIG. 3A.

Referring now to FIG. 4A, the load management system 400 may be implemented and may function similarly to the load management system 100 of FIG. 1, except that the load management system 400 may show an exemplary response of the PSD 200 to detection of a load step and/or significant load increase (e.g., high rate of increase to a peak power level 306 where $kW_{max}$=90% load level, as shown by FIG. 3A, for a peak power duration 310 (e., duty cycle) of $T_{max}$=1 second), and where $kW_{min}$=10% load level for a minimum power duration 312 of $T_{min}$=1 second.

In embodiments, broadly speaking, the PSD 200 may respond to high rates of change in load demand associated with AI loads 122 and/or demand loads 210 by determining an average load power (318, FIGS. 3A-3C) to be drawn from the utility AC source 104 and maintaining the average load power by drawing power 204, 216 from the utility AC source and the rapid-recharge DC storage device 214 respectively according to a proportional relationship. For example, referring in particular to FIG. 4A, the PSD 200 may respond to the load increase (e.g., which may represent a higher rate of change than the utility AC source 104 can withstand) by first calculating the average load power 318 at 50% of load level (as shown above with respect to FIG. 3A). For example, during the peak power period $T_{max}$ (312) the controller 218 may maintain the average load power 318 from the utility AC source 104 at 50% load level by drawing 50% of input power 204 from the utility AC source and 40% of input power 216 from the rapid recharge DC storage device 214, such that the total output power 402 satisfies the peak power level 306 at 90% load level.

Figure 4B:
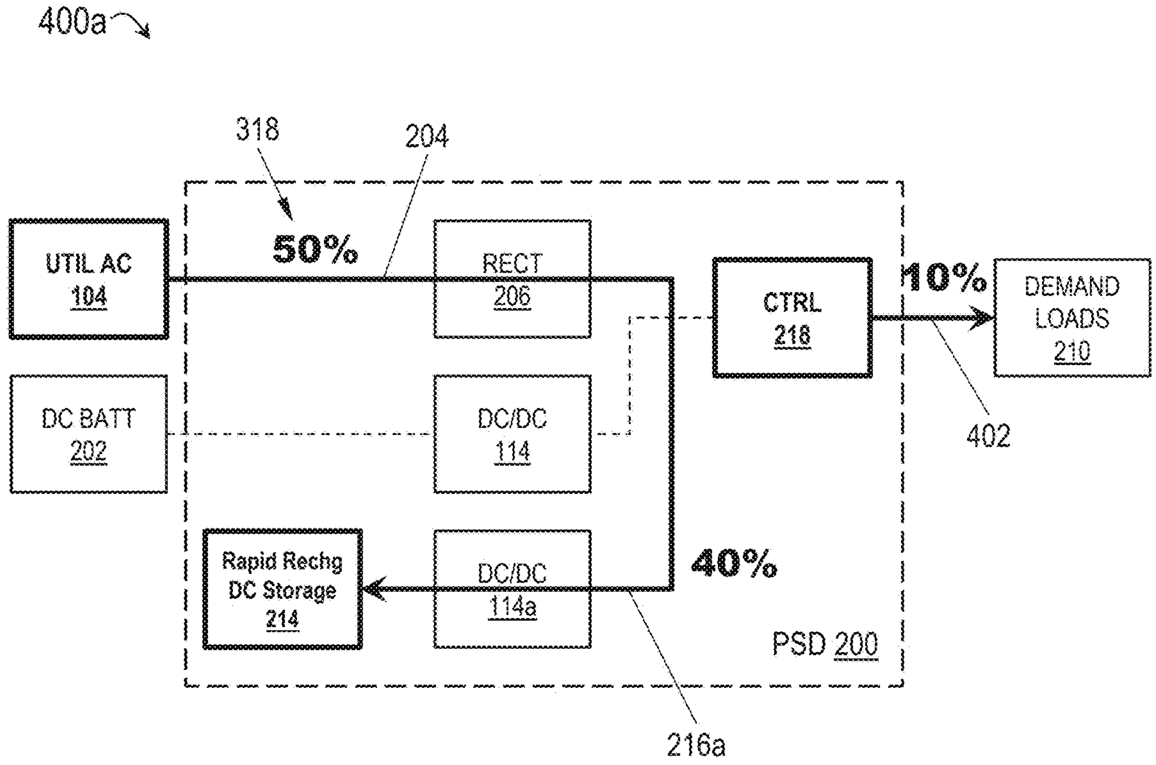

In embodiments, referring now to FIG. 4B, the load management system 400*a* may be implemented and may function similarly to the load management system 400, except that the load management system 400*a* may show an exemplary response of the PSD 200 to detection of a load drop and/or significant load decrease (e.g., high rate of decrease to a minimum power level 308 where $kW_{min}$=10% load level, as shown by FIG. 3A, for a peak duration 310 of $T_{min}$=1 second).

In embodiments, the PSD 200 may respond to the load decrease while maintaining the average load power 318 drawn from the utility AC source 104 at 50% load level by maintaining the input power 204 drawn from the utility AC source at 50% (402) but diverting 40% load level drawn from the utility AC source to rapid recharge 216*a* of the DC storage device 214, resulting in total output power 402 of 10% load level (or $kW_{min}$, 306) for the minimum power duration 312 shown by FIG. 3A.

Figure 4C:
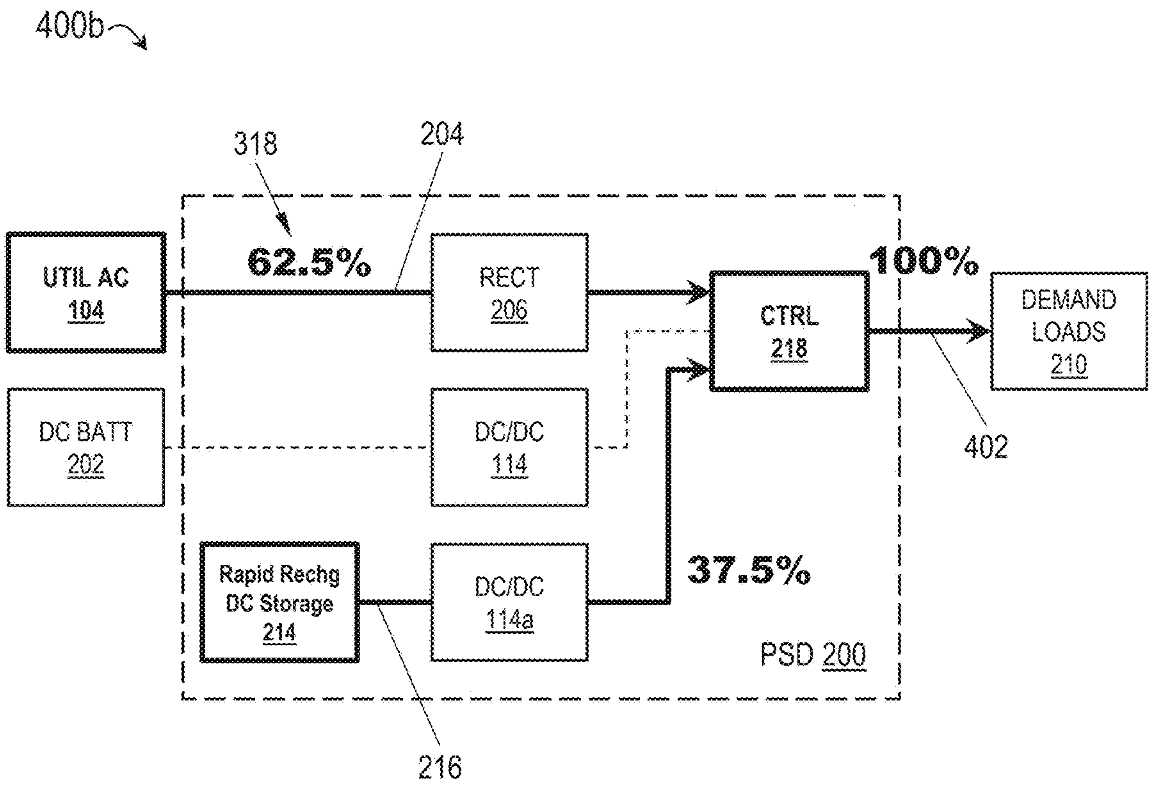
FIGS. 4C and 4D illustrate operations of the load management control system of FIG. 2 based respectively on the load conditions illustrated in FIG. 3B.
Figure 4D:
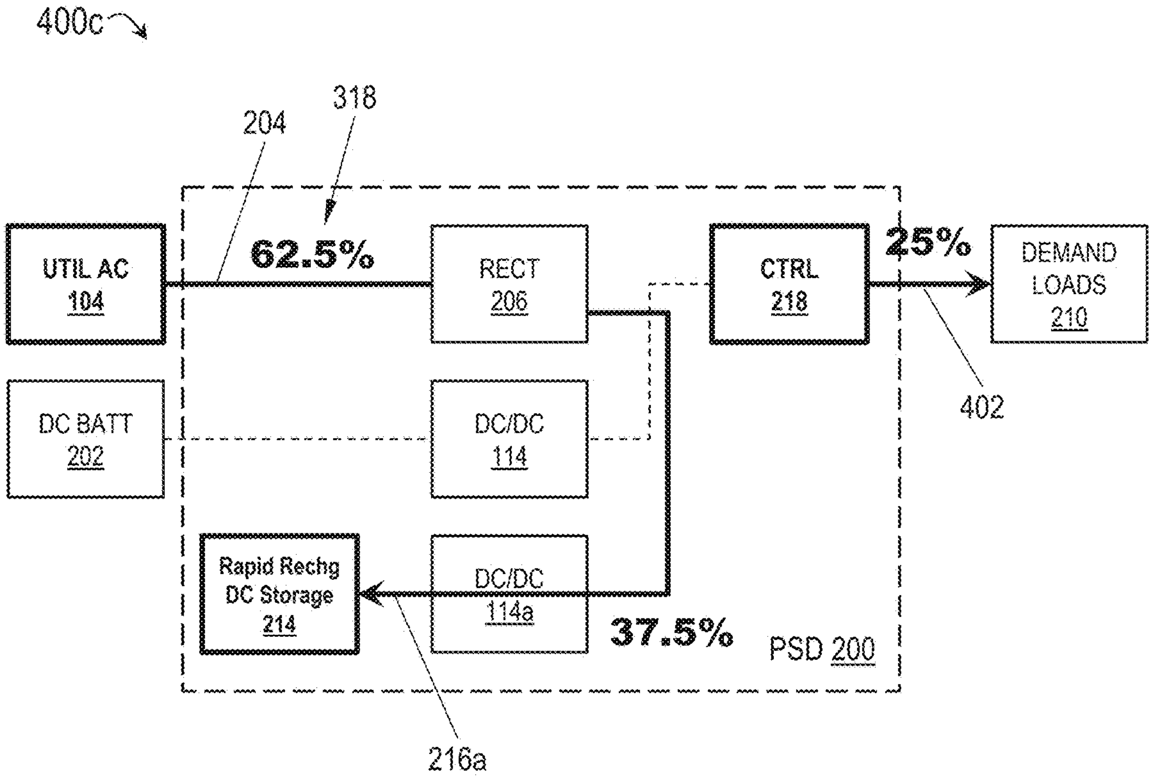

Referring now to FIGS. 4C and 4D, the load management systems 400*b*, 400*c* respectively show an exemplary response by the PSD 200 to the load conditions shown by FIG. 3B (e.g., $kW_{max}$=100% load level, $kW_{min}$=25% load level, $T_{max}=T_{min}$=1 second).

In embodiments, referring in particular to FIG. 4C, the PSD 200 of the load management system 400*b* may respond to the load increase (e.g., which may represent a higher rate of change than the utility AC source 104 can withstand) by first calculating the average load power 318 at 62.5% of load level (as shown by FIG. 3B). For example, during the peak power period $T_{max}$ the controller 218 may maintain the average load power 318 at 62.5% load level by drawing 62.5% of input power 204 from the utility AC source 104 and 37.5% of input power 216 from the rapid recharge DC storage device 214, such that the total output power 402 satisfies the peak power level 306 at 100% load level.

In embodiments, referring in particular to FIG. 4D, the PSD 200 of the load management system 400*c* may respond to the load decrease while maintaining the average load power 318 at 62.5% load level by maintaining the input power 204 drawn from the utility AC source 104 at 62.5% (412) but reducing the total output power 402 to 25% load level (or $kW_{min}$, 306) and diverting 37.5% of input power from the utility AC source to rapid recharge 216*a* of the DC storage device 214 (e.g., for the minimum duration 312 shown by FIG. 3B).

In embodiments, with particular respect to the load management systems 400*a*, 400*c* of FIGS. 4B and 4D, the PSD 200 may ideally attempt to recharge the rapid-recharge DC storage device 214 (e.g., during minimum power periods (312, FIGS. 3A-3C)) at a similar or identical rate to which the DC storage device provides input power 216 (e.g., during peak power periods 310, FIGS. 3A-3C). Accordingly, the amount of energy provided by the DC storage device 214 during peak power periods 310 may be restored to the DC storage device during minimum power periods 312. In embodiments, the controller 218 may monitor the storage capacity and/or current energy level of the DC storage device 214, such that the DC storage device is able to provide input power 216 during peak power periods 310 as needed to maintain average load power (318, FIGS. 3A-3C). For example, if sufficient energy is not restored to the DC storage device 214, the DC storage device may be depleted; similarly, if too much energy is restored to the DC storage device, the DC storage device may exceed its rated voltage.

In embodiments, the controller 218 may monitor a State of Charge (SoC) of the DC storage device 214 over a longer timeframe with respect to peak and minimum power periods 310, 312 (e.g., 1 minute=60 seconds) such that an equilibrium may be established and maintained with respect to energy provided by, and restored to, the DC storage device. For example (e.g., when the controller 218 detects that the stored energy level of the DC storage device 214 is above or below a threshold level or otherwise higher or lower than an optimal level), the controller may adjust or update the average load power 318 provided by the utility AC source 104 and DC storage device (or diverted from the utility AC source to recharge the DC storage device) in order to adjust the amount of power 216, 216*a* respectively drawn from or returned to the DC storage device. In some embodiments, the controller 218 may adjust the average load power 318 ($kW_{avg}$):

$$kW_{avg} = \frac{(kW_{min} * T_{min} + kW_{max} * T_{max})}{T_{min} + T_{max}} + kW_{offset}$$

where $$kW_{offset} = kW_{offset} + G * (SoC_{target} - SoC_{calculated})$$

and where SoC refers to the State of Charge of the DC storage device 214. For example, the controller 218 may calculate $SoC_{calculated}$ based on the specifications of the DC storage device 214 and may set $SoC_{target}$ based on engineering design choices, SWaP-C factors, or other considerations. In embodiments, the gain G may control the rate (based, e.g., on a design choice or control input) at which the controller 218 increases or decreases the average load power 318.

In some embodiments the controller 218, based on the storage capacity of the DC storage device 214 and the current State of Charge (SoC; e.g., the amount of energy currently stored by the DC storage device, for example as a percentage or proportion of its full capacity) may choose, select, or set peak and/or minimum durations $T_{max}$, $T_{min}$ (310, 312) so as to allow time for the controller to calculate a more accurate or precise average load power 318 while preventing depletion of the DC storage device.

Figure 4E:
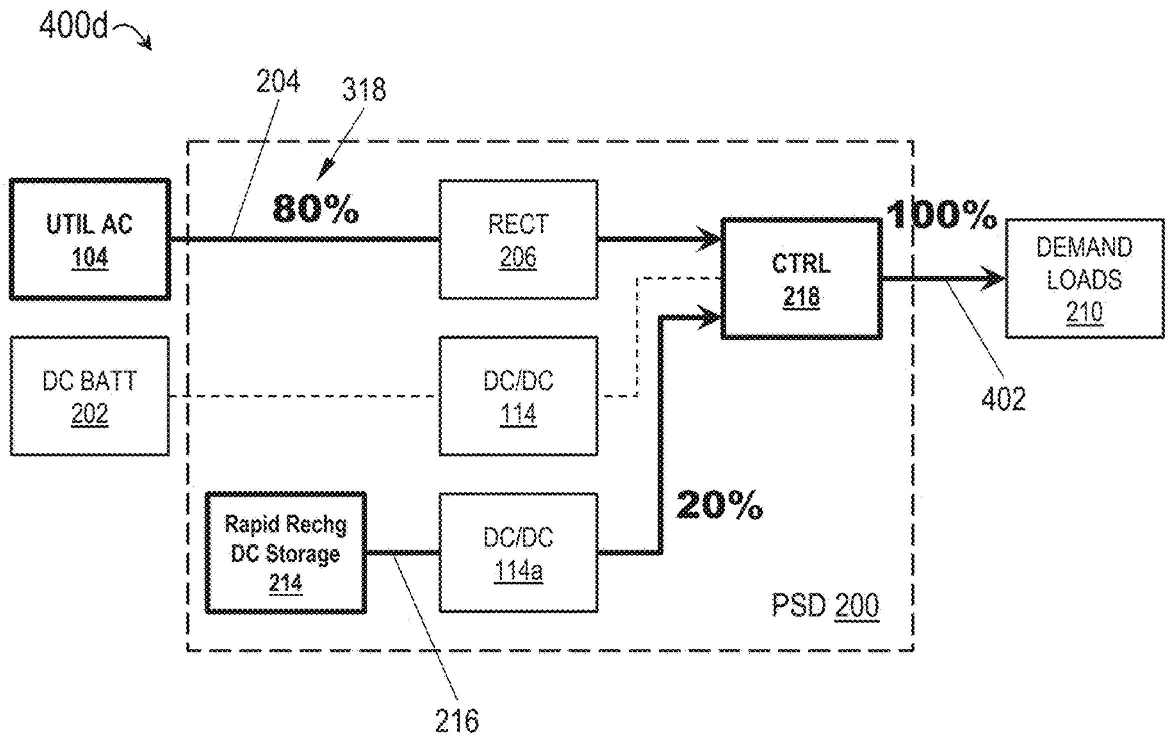
FIGS. 4E and 4F illustrate operations of the load management control system of FIG. 2 based respectively on the load conditions illustrated in FIG. 3C.
Figure 4F:
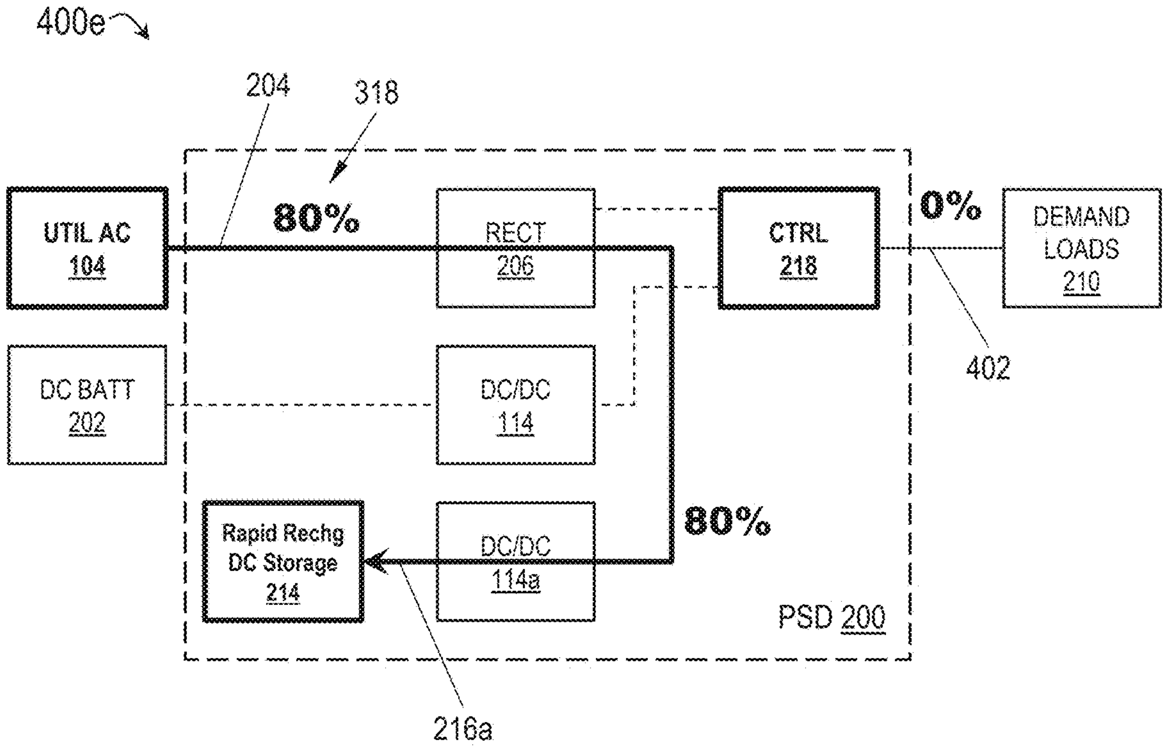

Referring now to FIGS. 4E and 4F, the load management systems 400*d*, 400*e* respectively show an exemplary response by the PSD 200 to the load conditions shown by FIG. 3C (e.g., $kW_{max}$=100% load level, $T_{max}$=1.6 seconds, $kW_{min}$=0% load level, $T_{min}$=0.4 seconds).

In embodiments, referring in particular to FIG. 4E, the PSD 200 of the load management system 400*d* may respond to the load step/load increase by first calculating the average load power 318 at 80% of load level (as shown by FIG. 3C). For example, during the peak power period $T_{max}$ the controller 218 may maintain the average load power 318 from the utility AC source 104 at 80% load level by drawing 80% of input power 204 from the utility AC source and 20% of input power 216 from the rapid recharge DC storage device 214, such that the total output power 402 satisfies the peak power level 306 at 80% load level.

In embodiments, referring in particular to FIG. 4F, the PSD 200 of the load management system 400*e* may respond to the load drop/load decrease while maintaining the average load power 318 at 80% load level by maintaining the input power 204 drawn from the utility AC source 104 at 80% and diverting the full 80% of input power from the utility AC source to rapid recharge 216*a* of the DC storage device 214 (e.g., for the minimum duration 312 shown by FIG. 3C). Accordingly, the total output power 402 may be reduced to 0% load level (or $kW_{min}$, 306), but the DC storage device 214 may be fully recharged such that a balanced SoC is maintained. For example, the DC storage device may provide input power at 20% load level for the peak power duration 310 ($T_{max}$=1.6 seconds) and may be recharged at 80% load level for the minimum power duration 312 ($T_{max}$=0.4 seconds).

Figure 5A:
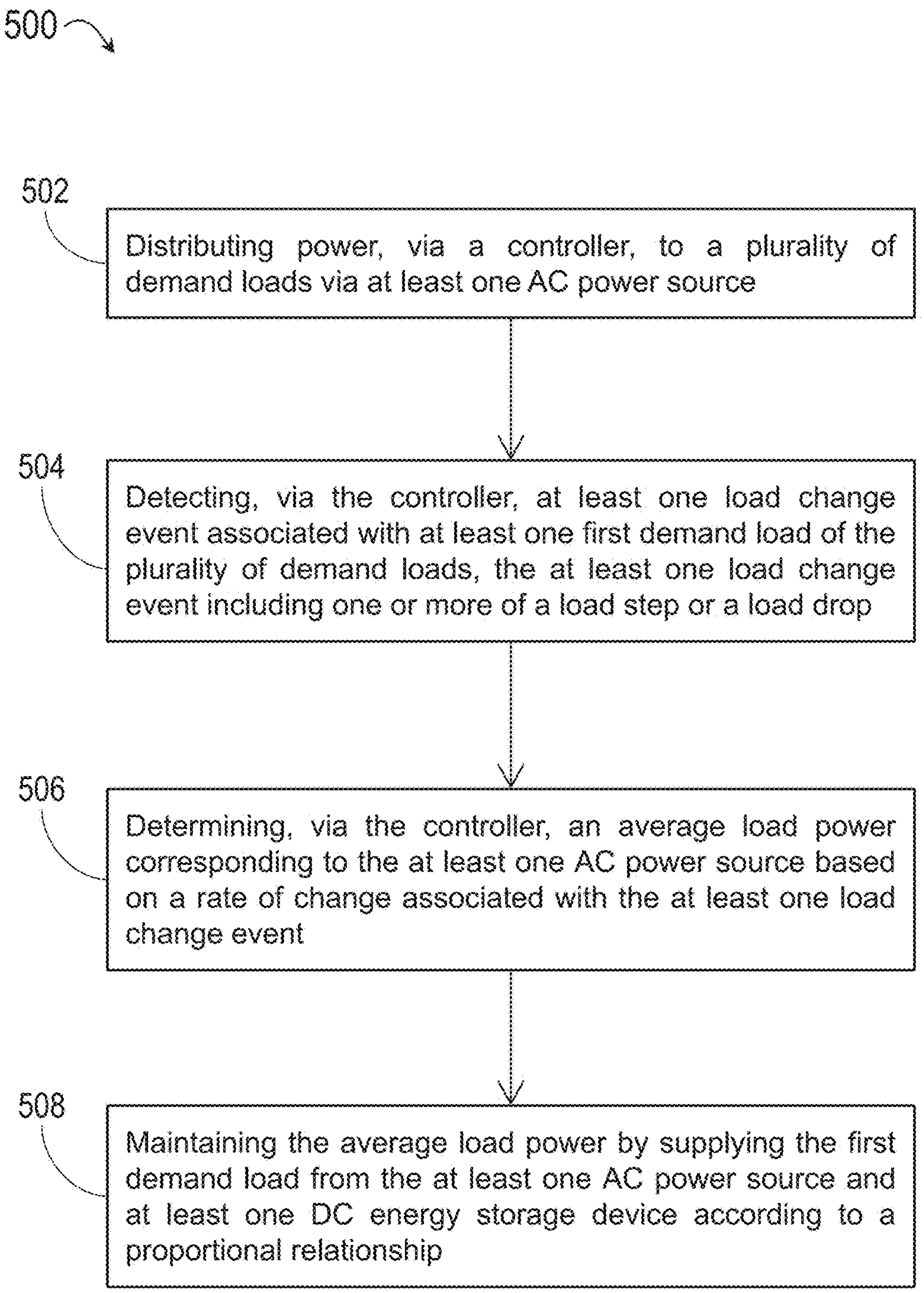
FIGS. 5A and 5B are process flow diagrams of a method for load management control according to the inventive concepts disclosed herein.

Referring now to FIG. 5A, the method 500 may be implemented by the PSD 200 and may include the following steps.

At a step 502, the PSD distributes power to one or more demand loads (which may include one or more AI loads characterized by rapid and/or periodic high rates of change) via a utility grid or like AC power source. In some embodiments, the demand loads may be supplied by a combination of AC and DC sources.

At a step 504, the PSD detects a load change event (e.g., load step, high rate of load increase, load drop, high rate of load decrease) with respect to one or more AI loads or other like demand loads. In some embodiments, the load change event is indicative of a periodic shift or fluctuation between a peak power level and a minimum power level.

At a step 506, the PSD determines an average load power to be drawn from the utility AC power source, based on the detected rate of change of the load change event. For example, average load power may account for the peak and minimum power levels as well as the respective peak and minimum durations during which said peak and minimum power levels will be necessary.

At a step 508, the PSD maintains the average load power by supplying the AI load/s from the utility AC source and a rapid-recharge DC storage device based on proportional relationships selected to maintain a consistent average load power from the utility AC source. In some embodiments, during a peak power period associated with a peak power level of the AI load/s, the PSD supplies the AI load/s from the utility AC source and a rapid-recharge DC storage device based on a first proportion. Similarly, during a minimum power period associated with a minimum power level of the AI load/s, the PSD maintains the average load power by adjusting the proportion of input power drawn from the utility AC source and DC storage device, e.g., directing a portion of power drawn from the utility AC source to recharge the DC storage device for the next peak power cycle while maintaining the average load power.

Figure 5B:
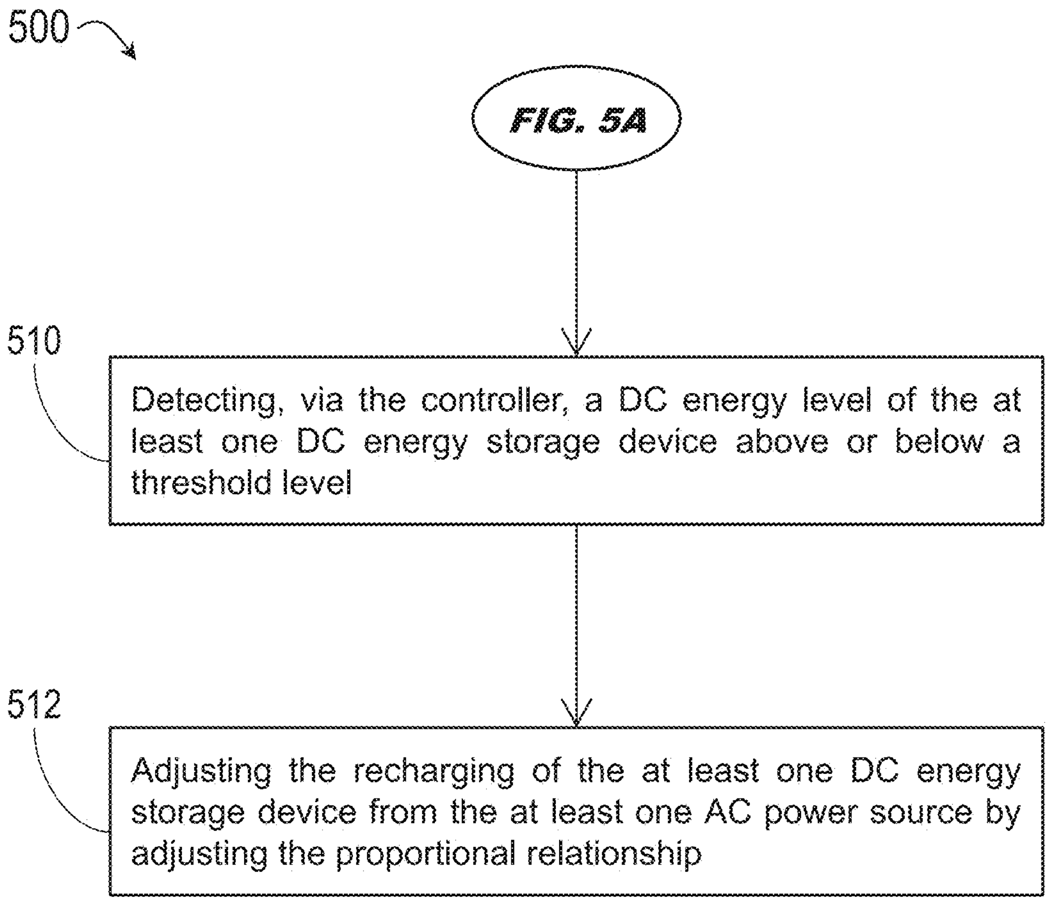

Referring also to FIG. 5B, the method 500 may include steps 510 and 512. At the step 510, the PSD detects a DC energy storage capacity of the DC storage device above or below a threshold level (e.g., at or above an upper threshold, at or below a lower threshold).

At the step 512, the PSD adjusts the proportions via which energy is drawn from the utility AC source and/or the DC storage device to adjust the recharging rate of the DC storage device (e.g., increases the amount of input power provided to the DC storage device from the utility AC source and/or increases the recharging rate if capacity is below a lower threshold level, reduces the recharging rate if capacity is above an upper threshold level). In some embodiments, the PSD sets the peak and/or minimum durations based on the current storage level of the DC storage device. In some embodiments, the peak and minimum durations are not equal to each other.

CONCLUSION

It is contemplated that embodiments of the inventive concepts disclosed herein may have numerous advantages. For example, as noted above, AC grids and other like utility sources may be protected from changes in energy consumption rate associated with AI-type and other high rate of change loads. As a result, the utility grid will be less susceptible to oscillations, stability issues, and/or potential collapse which may affect not only the grid itself but other downstream users supplied by the grid.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

We claim:

1. A system for load management control, comprising:

at least one direct current (DC) energy storage device;

a controller operatively coupled to the at least one DC energy storage device and at least one alternating current (AC) power source, the controller including at least one control processor and configured to:

manage a distribution of power from the at least one AC power sources to a plurality of demand loads;

detect at least one indicator of a first demand load of the plurality of demand loads, wherein the first demand load is characterized by a periodic fluctuation between a peak power level for a peak duration and a minimum power level for a minimum duration;

determine an average load power based on one or more of the peak power level, the minimum power level, the peak duration, or the minimum duration; and maintain the output power from the at least one AC power source at the average load power by:

during each peak duration, supplementing the at least one AC power source by drawing additional power from the at least one DC energy storage device according to a first proportional relationship; and during each minimum duration, diverting a portion of the output power for storage by the at least one DC energy storage device according to a second proportional relationship.

2. The system for load management control of claim 1, wherein the controller is configured to determine, based on one or more of the detected indicator or the peak power level, the peak duration.

3. The system for load management control of claim 1, wherein the controller is configured to maintain the output power from the at least one AC power source at the average load power during the minimum duration by diverting the portion of the output power for recharging the at least one DC energy storage device according to the second proportional relationship.

4. The system for load management control of claim 3, wherein the DC energy storage device is associated with a DC energy level, and wherein the controller is configured to:

detect the DC energy level above or below a threshold level; and adjust the recharging of the DC energy storage device from the at least one AC power source by adjusting the second proportional relationship.

5. The system for load management control of claim 4, wherein the controller is configured to respectively increase or decrease a recharge rate associated with the recharging of the at least one DC storage device by respectively increasing or decreasing the diverted portion of the output power supplied to the DC storage device.

6. The system for load management control of claim 1, wherein the controller is configured to determine, based on one or more of the at least one indicator or the minimum power level, a duration of the minimum power period.

7. The system for load management control of claim 6, wherein the peak duration is not equal to the minimum duration.

8. The system for load management of claim 4, wherein the controller is configured to set one or more of the peak duration or the minimum duration based on the DC energy level.

9. A method for load management control, the method comprising:

distributing power, via a controller, to a plurality of demand loads via at least one alternating current (AC) power source;

detecting, via the controller, at least one indicator of a first demand load of the plurality of demand loads, wherein the first demand load is characterized by a periodic fluctuation between a peak power level for a peak duration and a minimum power level for a minimum duration;

determining, via the controller, an average load power based on one or more of the peak power level, the minimum power level, the peak duration, or the minimum duration; and maintaining the output power from the at least one AC power source at the average load power by:

during each peak duration, supplementing the at least one AC power source by drawing additional power from at least one direct current (DC) energy storage device according to a first proportional relationship; and during each minimum duration, diverting a portion of the output power for storage by the at least one DC energy storage device according to a second proportional relationship.

10. The method of claim 9, wherein maintaining the output power from the at least one AC power source at the average load power by, during each minimum duration, diverting a portion of the output power for storage by the at least one at least one direct current (DC) energy storage device according to a second proportional relationship includes:

maintaining the output power from the at least one AC power source at the average load power during each minimum duration by diverting the portion of the output power for recharging the at least one DC energy storage device according to the second proportional relationship.

11. The method of claim 10, further comprising:

detecting, via the controller, a DC energy level of the at least one DC energy storage device above or below a threshold level; and adjusting the recharging of the at least one DC energy storage device via the diverted portion of the output power by adjusting the second proportional relationship.

12. The method of claim 11, wherein adjusting the recharging of the at least one DC energy storage device via the diverted portion of the output power by adjusting the second proportional relationship includes:

increasing or decreasing a recharge rate associated with the recharging of the DC storage device by respectively increasing or decreasing the diverted portion of the output power supplied to the DC storage device from the AC power source.

13. The method of claim 9, wherein determining, via the controller, an average load power based on one or more of the peak power level, the minimum power level, the peak duration, or the minimum duration event includes:

determining, based on one or more of the at least one indicator, the peak power level, or the minimum power level, at least one of:

the peak duration; or the minimum duration of the minimum power period.

14. The method of claim 13, wherein the peak duration and the minimum duration are not equal.

15. The method of claim 11, further comprising:

setting, via the controller, one or more of the peak duration or the minimum duration based on the DC energy level.

* * * * *